US 8,489,435 B2

(12) United States Patent
Gabriel et al.

(10) Patent No.: US 8,489,435 B2
(45) Date of Patent: Jul. 16, 2013

(54) METHOD AND DEVICE FOR STORING AND ACCESSING DATA IN A COMPUTER TRAVEL RESERVATION SYSTEM

(75) Inventors: Hugues Gabriel, Nice (FR); Vanessa Auzanne, Nice (FR); Alexandre Taillades, Nice (FR)

(73) Assignee: Amadeus S.A.S., Sophia Antipolis (FR)

( * ) Notice: Subject to any disclaimer, the term of this patent is extended or adjusted under 35 U.S.C. 154(b) by 619 days.

(21) Appl. No.: 10/520,114

(22) PCT Filed: Jun. 13, 2003

(86) PCT No.: PCT/FR03/50010
§ 371 (c)(1),
(2), (4) Date: Jan. 3, 2005

(87) PCT Pub. No.: WO2004/006147
PCT Pub. Date: Jan. 15, 2004

(65) Prior Publication Data
US 2006/0020625 A1 Jan. 26, 2006

Related U.S. Application Data

(60) Provisional application No. 60/444,673, filed on Feb. 4, 2003.

(30) Foreign Application Priority Data

Jul. 2, 2002 (FR) ...................................... 02 08241

(51) Int. Cl.
*G06Q 10/00* (2006.01)
(52) U.S. Cl.
USPC .................................................. 705/5; 705/6

(58) Field of Classification Search
USPC ........................................................ 705/5, 6
See application file for complete search history.

(56) References Cited

U.S. PATENT DOCUMENTS

| | | | | |
|---|---|---|---|---|
| 4,788,643 A | * | 11/1988 | Trippe et al. ..................... 705/6 |
| 5,021,953 A | * | 6/1991 | Webber et al. .................... 705/6 |
| 5,948,040 A | * | 9/1999 | DeLorme et al. ................. 705/5 |
| 6,023,679 A | | 2/2000 | Acebo et al. ..................... 705/5 |
| 6,202,065 B1 | * | 3/2001 | Wills ................................. 707/5 |
| 6,236,938 B1 | | 5/2001 | Atkinson et al. .............. 701/214 |
| 7,194,417 B1 | | 3/2007 | Jones ................................ 705/5 |
| 7,305,356 B2 | | 12/2007 | Rodon ............................. 705/27 |
| 7,428,596 B2 | | 9/2008 | Grandemange et al. ...... 709/238 |
| 2001/0007088 A1 | * | 7/2001 | Winter et al. ................. 701/208 |

(Continued)

OTHER PUBLICATIONS

Article entitled "Amadaues Pro Tempo Guide", dated 2004.*

(Continued)

*Primary Examiner* — Mahesh Dwivedi
(74) *Attorney, Agent, or Firm* — Wood, Herron & Evans, LLP (57) ABSTRACT

A process for storing and accessing data in databases of a computerized travel reservation system includes, for each type of information to be stored, created rules associating a set of criteria defining the trips to which the information applies, and a content representing the value of the information to be applied, the set of criteria of a rule including a pair of markets with a market of origin that is defined by the geographical zone of departure on the trip and a destination market which is defined by the geographical zone of arrival of the trip. A database stores the defined markets and a database stores the created rules.

17 Claims, 4 Drawing Sheets

U.S. PATENT DOCUMENTS

| | | | |
|---|---|---|---|
| 2002/0082879 A1* | 6/2002 | Miller et al. | 705/5 |
| 2002/0111935 A1* | 8/2002 | Jones et al. | 707/1 |
| 2002/0143587 A1* | 10/2002 | Champernowne | 705/5 |
| 2002/0156661 A1* | 10/2002 | Jones et al. | 705/6 |
| 2003/0014286 A1* | 1/2003 | Cappellini | 705/5 |
| 2003/0033164 A1* | 2/2003 | Faltings et al. | 705/1 |
| 2003/0074471 A1* | 4/2003 | Anderson et al. | 709/245 |
| 2003/0110062 A1* | 6/2003 | Mogler et al. | 705/5 |

OTHER PUBLICATIONS

European Patent Office, Search Report issued in International application No. PCT/FR03/50010 dated Dec. 12, 2003.

* cited by examiner

METHOD AND DEVICE FOR STORING AND ACCESSING DATA IN A COMPUTER TRAVEL RESERVATION SYSTEM

BACKGROUND OF THE INVENTION

The present invention relates to a process for storing and accessing data in databases of a computerized travel reservation system. It also relates to a device adapted to use this process.

The invention will find particular application for computerized air transport reservation systems.

DESCRIPTION ON THE RELATED ART

At present, companies that control such computerized reservation systems need a large number of personnel to ensure the maintenance of the data necessary for the sale of reservation products. These data are each connected to reservation schedule, which must be available to the publication at the computer systems adhering to the overall system. This can include as well internal systems as well as systems external to the systems of these enterprises.

The maintenance of the data necessary to the computerized reservation system, as takes place at present, gives rise to several drawbacks.

In the first place, the data are applied to the different flight plans, plan by plan. However, the organization of reservation systems by computer has software at present directed to representation of the markets in geographic terms and not schedule terms.

Another present drawback is that the data are organized by flight number and not in terms of origin and destination of the flight.

Another drawback of the present techniques is the time necessary to generate changes in the databases. A person is thus necessary for updating each individual flight, but the changes connected with a flight can imply multiple modifications, particularly in different periods of the flight. Thus, a simple change of flight can give rise to several hundreds of changes of lines in the schedule or recordation of the reservation inventory.

Another drawback is that the modifications made at present require substantial human intervention, which increases the risk of error and the problems of incoherence between flight plans and the inventory.

SUMMARY OF THE INVENTION

The present invention permits overcoming the drawbacks of the techniques known at present and, to do this, it introduces new software for the management of the databases so as to generate the most rapid changes with greatest precision and better adaptation to the needs of the clientele.

In this connection, the present invention provides a process for storing and accessing data which uses the mode and criteria of selection permitting updating or searching the contents corresponds to a type of information in the most efficacious way which will be appropriate in terms of the market corresponding to separate geographic zones.

Other objects and advantages will become apparent in the course of the description which follows, of a preferred embodiment of the invention, which however is not limiting.

The present invention relates to a process for storing and accessing data in databases of a computerized travel reservation system. According to the invention:

for each type of information to be stored, there are created rules associating:
  a set of criteria defining the trips to which the information applies,
  a content representing the value of the information to be applied;
the set of criteria of a rule comprises a pair of markets with a market of origin as defined by the geographical zone of departure of the trip and a destination market which is defined by the geographical zone of arrival of the trip,
the define markets are stored in a database,
the created rules are stored in a database.

According to preferred features of embodiment, this process is such that:

each market is defined by a geographical zone selected from the following types of geographic zones: airport, city, state and country, country, geographic region, world, or a combination of these types of geographic zones.

there is created a table in which to each type of geographic zone there is assigned a priority rank decreasing as a function of the precision of the geographic zone.

the priority of each market is determined according to the priority rank of the type of geographic zones which it defines or the combination of the ranks of priority of the types of geographic zones that it defines.

the priority of each pair of markets is determined by adding the priority of the origin market and the priority of the destination market.

there are utilized additional criteria in the set of criteria, a weight is assigned to each additional criterion defining its degree of importance.

the stored rule corresponding to a trip search is accessed by:
  entering the region of origin and the region of destination of the trip,
  searching the pairs of markets which agree with said locations of origin and destination,
  computing the priority of each pair of corresponding markets for said locations of origin and destination,
  returning the content of the rule having the pair of markets whose priority has the lowest value.

if two pairs of corresponding markets have a same value of priority, the content of the rule is returned whose market of origin has the lowest value of priority.

Preferably, to access the rules:

1°. additional criteria of a trip search are entered,
2°. for each rule whose pairs of markets agree with the regions of origin and destination, there is computed the weight of the rule corresponding to the sum of the weights of the additional criteria of the rule,
3°. the rule is selected which has the highest weight,
4°. if the additional search criteria of the trip do not agree with the additional criteria of the selected rule, the rule is selected that has the lower intermediate weight,
5°. if the additional trip search criteria agree with the additional criteria of the rule selected in the last instance, the content of the rule is stored,
6°. to the extent that the stored content corresponds only partially to the additional trip search criteria, steps 3 to 5 are repeated,
7°. the content of the rules which has been stored is returned.

The invention also relates to a storage and accessing device for data in databases of a computerized travel reservation system adapted to use the process described above. According to the invention, this device:

comprises storage means for markets of origin defined by the geographical zones of departure of the trips and markets of destination defined by the geographical zones of arrival of the trips, for each type of information to be stored, it comprises means for acquiring rules associating:
  a set of criteria defining trips to which the information applies,
  a content representing the value of the information to be applied
it comprises means for storing the acquired rules.

BRIEF DESCRIPTION OF THE DRAWINGS

The accompanying drawings are given by way of example and are not limiting of the invention. They represent only one embodiment of the invention and permit its easy comprehension.

DESCRIPTION OF THE PREFERRED EMBODIMENTS

Figure 1:
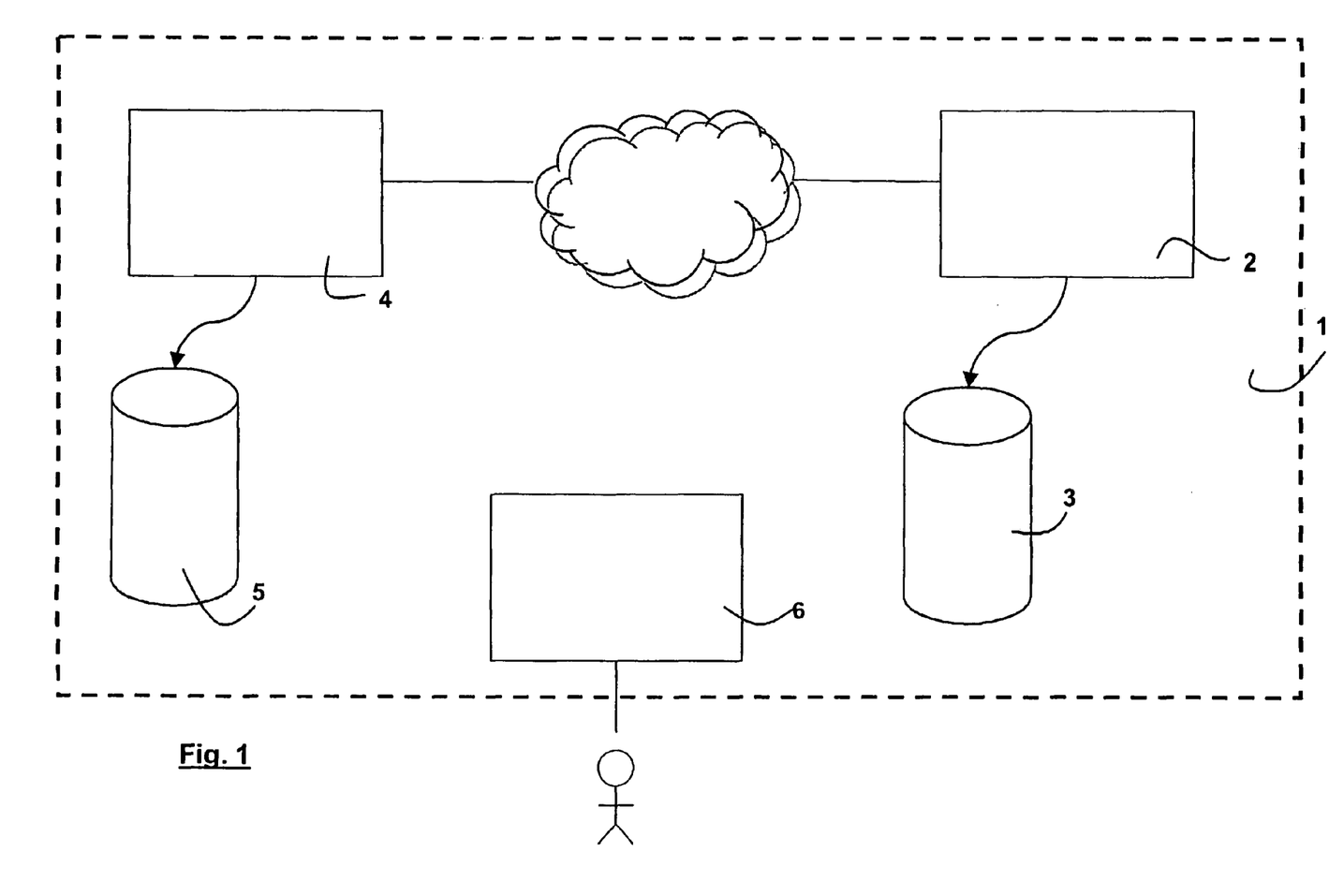
FIG. 1 is a general schematic view of certain components of a computerized reservation system.

With reference to FIG. 1, a user can practice the process of the invention by means of a graphical user interface 6 which permits accessing other constituents of a computerized reservation system 1. Among these constituents, a central server 2 ensuring the management of the rules of the system is present and is connected to a central database 3. The central database 3 is adapted to store the rules which will be defined hereafter.

Moreover, a server 4 for defining a geographical market is also present and comprises a market database 5 adapted to store a list of markets which will also be defined hereafter.

According to the invention, the storage of the different types of information is controlled in a new manner.

The types of information relate to the data attributed to the different trips. In what follows of this description, there will be given an example corresponding to a preferred application of air transport in which the trips correspond to flights. There is meant by a flight a transport of passengers between a point of origin (region of origin) and a point of destination (region of destination).

In this example, different types of information are necessary and particularly:
  the numbers of the loading terminals,
  information concerning traffic restrictions,
  rules relating to the distribution of tickets by the Internet,
  rules relating to meal service,
  the types of classes of reservation which are recognized.

To manage the content in question of each type of information for each flight element contained in the databases of the reservation system, the present invention uses the creation of rules.

These rules comprise a first section corresponding to the criteria used for the selection of trips to which the type of information is applicable.

Another section of the rule is constituted by the content corresponding to the description of the value attributed to the types of information for the trips corresponding to the rule.

There is used for this purpose a set of criteria of definition of each rule. In a first instance, one criterion used consists in the creation of pairs of markets. In each pair of markets, there is distinguished an origin market and a destination market relating respectively to the geographic zone of departure and the geographic zone of arrival of the trips.

Each market can be an airport, a city, a state, a country, a region or else the whole world. There is thus given to the rules a geographical definition, per market.

The markets need not be homogeneous, namely, they can be constituted by a combination of different types of geographic zones. Of course, the definition of these markets must be coherent. For example, the geographic zone NICE cannot be included both in the French geographic zone and in the Italian geographic zone.

The different markets created are stored in a table in which there is given to them a priority value. The priority value of a market is a function of the priority rank of the geographic zone which defines it or of the combination of priority ranks of the geographic zones which define it (if the market is not homogeneous).

By assigning a priority rank to different types of geographical zones, there is reflected the precision or the wide scope of the corresponding geographic zone.

There is given in the following table an example of the assignment of priority ranks to different types of geographic zones.

| Type of geographic zone | Priority rank |
| --- | --- |
| Airport | 1 |
| City | 2 |
| Country and state | 3 |
| Country | 4 |
| Geographic region | 5 |
| World | 6 |

By using this table, there can be associated, in the server 4, the priority value of each market corresponding to an input parameter. For example, the use considers the definition of non-homogeneous market as follows:

M1=London+France, if the acquisition carried out by an input user is: Charles de Gaulle airport, the market M1 agrees with the search criterion with a priority value of 4 because the Charles de Gaulle airport agrees with the definition of country: France whose priority rank for this type of geographical zone is 4.

If there is considered a user input during a search operation corresponding to the Heathrow airport, the market 1 agrees with the priority value of 2 because the Heathrow airport is included in the geographical region of London which is a type of geographic zone having a priority rank of 2.

By this computation of priority for each market, there can be obtained the value of the priority of a pair of markets by simple addition of priority values of each market constituting it.

By way of supplemental example on this subject, if one considers the following pair of markets which has been created:

FRANCE−NICE+GREAT BRITAIN→NEW ZEALAND+SYDNEY+MELBOURNE,

The two markets which comprise the pair are heterogeneous. Their priority is determined with reference to a pair of regions of origin and of destination entered by the user, for example during a search operation.

Thus, a user entering the place of origin CHARLES DE GAULLE AIRPORT, will obtain a value of priority of the origin market of 4 (rank of the geographic zone FRANCE). Moreover, if he takes as the site of destination the SYDNEY airport, the destination market will have a priority value of 1 (corresponding to the priority rank of the geographic zone SYDNEY).

As a result, the value of priority of the pair of markets thus constituted is equal to 4+1=5.

It will be easily understood that the definition of such pairs of markets and the assignment of contents of types of information is not always sufficient for the definition of precise rules.

To refine the selection thus carried out by the pairs of markets, there are preferably used additional criteria which form an integral part of the set of criteria defining the trips to which the information applies in the rule.

Moreover, there is assigned a weight to each additional criterion so as to define its degree of importance.

There will be given in the following table an example of additional criteria usable with their respective weights.

| Additional criteria | Weight |
| --- | --- |
| Flight group | 64 |
| Type of occupation sharing | 32 |
| Flight period | 16 |
| Day of the week | 8 |
| Type of aircraft | 4 |
| Time of departure | 2 |
| Flight duration | 1 |

A set of criteria associated with a rule can comprise a combination of additional criteria such as have been given above.

In this connection, the total weight of the additional criteria assigned to a rule corresponds to the sum of the individual weights of these criteria.

For example, for a rule whose sole additional criterion is the flight group, the total weight is 64. This weight is thus greater than that of a rule whose additional criteria are flight period+day of the week+departure time of the flight (whose weight is 16+8+2=26).

The association of these additional criteria and of the definition of pairs of markets ensures an unambiguous creation of rules permitting assigning a content or one type of information to the data relative to the trips.

Of course, the integrity and the coherence of the data thus contained in each rule is verified. In particular, if the additional criteria are of the same type and have the same weight to define the different rules, the system will verify whether there is overlap between the values assigned to these different criteria.

Figure 2:
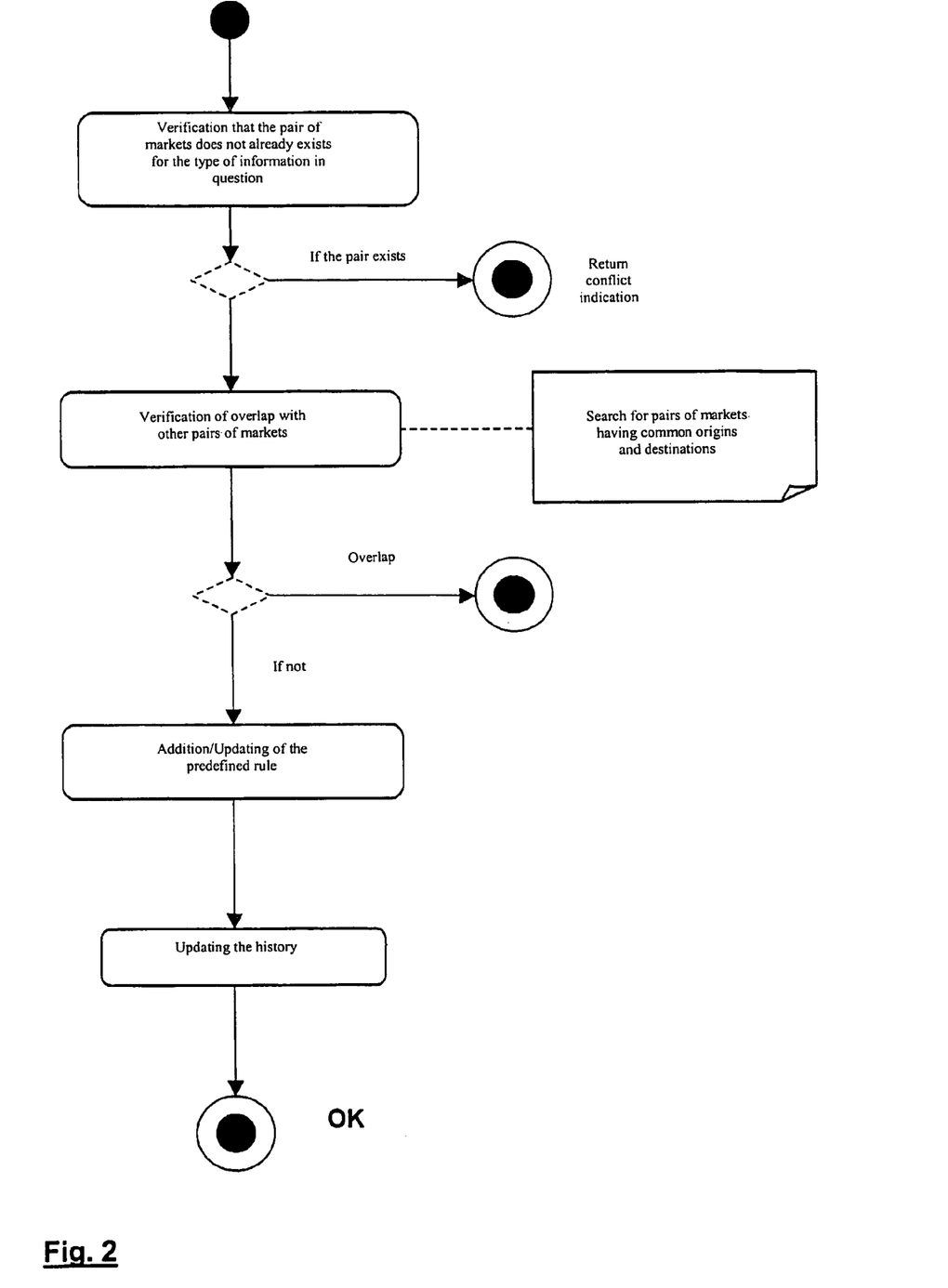
FIG. 2 represents a diagram showing the addition of a pair of markets.
Figure 3:
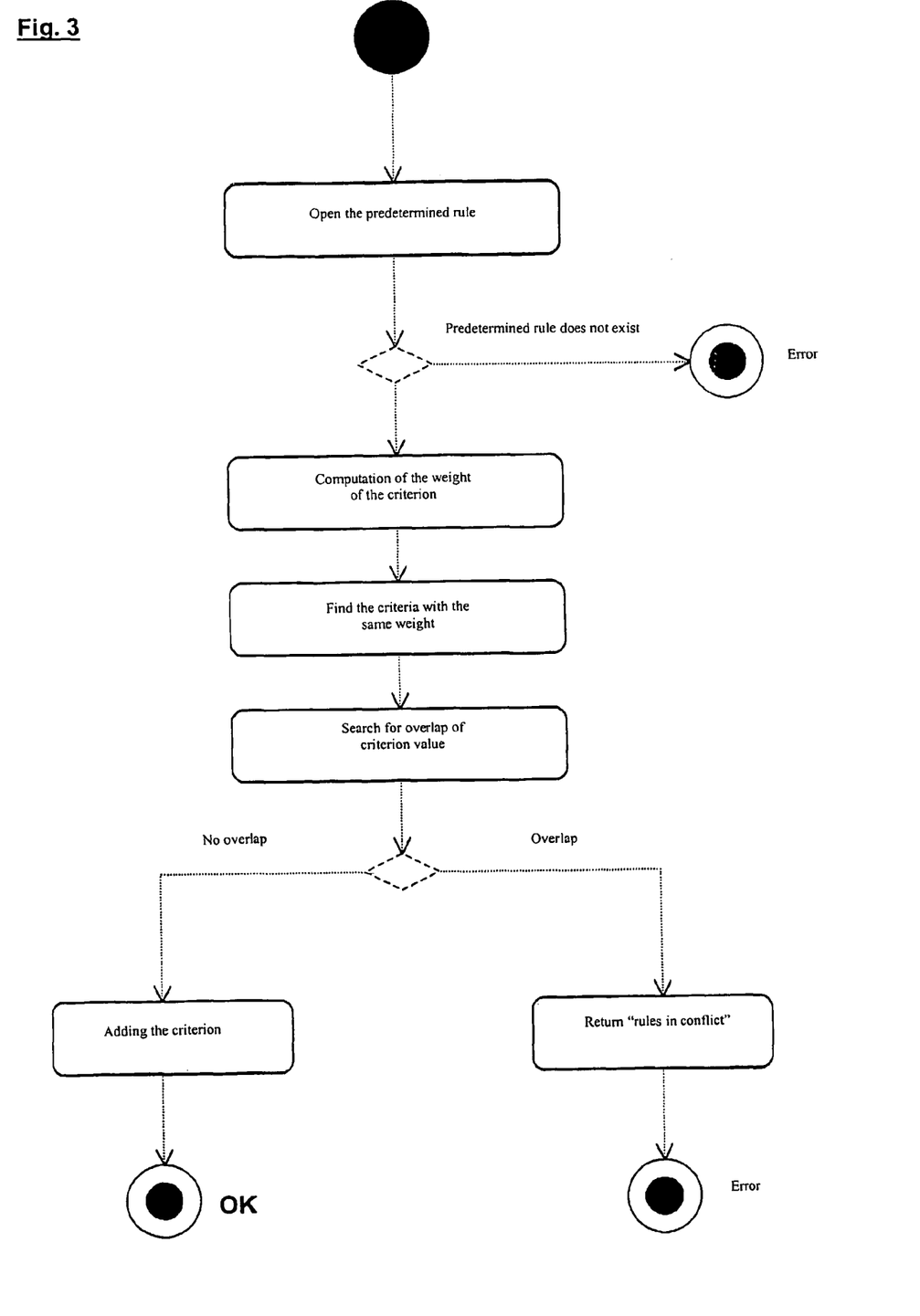
FIG. 3 is another diagram showing the addition of additional criteria in a rule.
Figure 4:
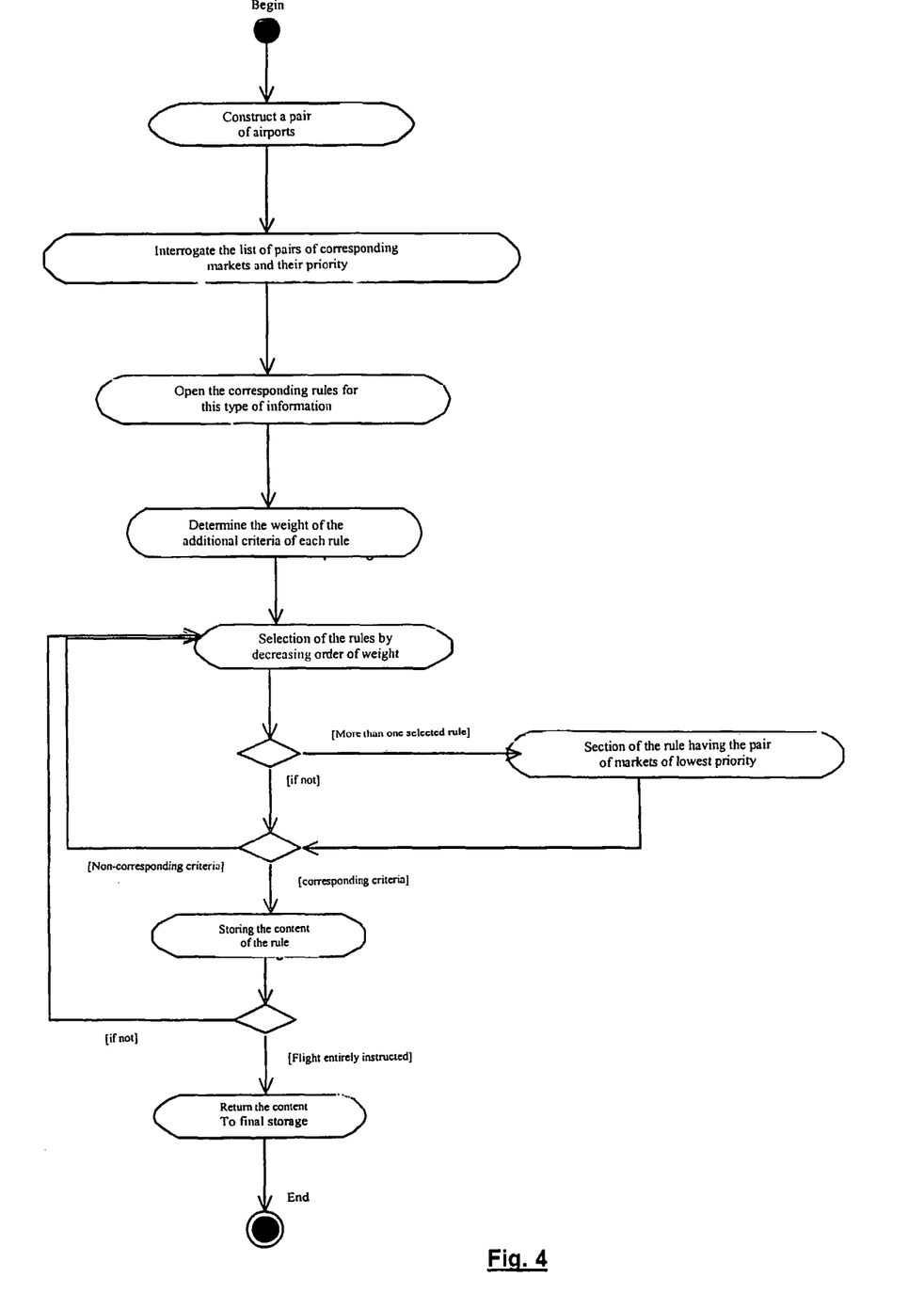
FIG. 4 shows an example of searching for an applicable rule in the framework of a trip search.

With reference successively to FIG. 2 to 4, there are given hereafter various examples of the practice of the process, for different functionalities.

FIG. 2 illustrates the possibility of adding or updating rules.

In the first instance, the process starts with a verification that the pair of markets acquired does not already exist for the type of information in question. If such is the case, an error information is returned by a conflict indicator.

If this pair still does not exist for the type of information in question, it is verified that it is not a matter of overlapping with other pairs of markets. To end end, the common origins and destinations in other market elements are searched.

If such an overlap exists, one returns conflict information by a conflict indicator. If not, one adds the rule thus constituted by default.

The history is then updated and the operation is terminated.

To add additional criteria to a rule thus predefined, there is carried out the process shown in FIG. 3.

In this connection, the predefined rule obtained by the steps of FIG. 2 is opened. If it is not retrieved from the system, an error information is returned.

If it is retrieved, the priority of the additional criterion acquired is repeated as input.

It is then searched whether additional criteria having the same priority already exist.

It is then searched if there is a possible overlap between the value of the criteria in such a case of additional criteria with the same priority.

If there is no overlap, the additional criteria can be added to the rule. If there is overlap, a notification "rules in conflict" is returned.

There will be given hereafter a third possible functionality of the process of the invention according to which there is sought a rule applicable to data as input. This example is shown in FIG. 4.

As input, the user acquires a pair of locations corresponding to the location of origin and the location of destination desired for his search. If desired, other additional search criteria can be acquired such as the desired flight time. Generally, the locations of origin and of destination are constituted by the names of airports.

At this point, there is required from the server 2 the list of pairs of markets corresponding to the acquired criteria as well as their priority value.

The rules corresponding to these pairs of markets are opened, which agree for the type of information sought.

It is thus determined the weight of the additional criteria for each rule to define the total weight of the rule.

The order of processing of the different rules which have been returned can thus be classified.

To this end, one begins by selecting the rule which comprises the highest total weight. If it appears that several rules have a same weight, one begins by selecting that which has the most precise priority for the pair of markets. Moreover, if it also appears that the rules have a same level of priority for a pair of markets, one first selects that which has the most precise level of priority of the market of origin.

Once the rule is thus selected, one verifies whether the additional criteria agree with the search criteria acquired by the user. If it appears that these criteria agree, the content associated with the rule is stored. If not, the step of selection of another rule is repeated, beginning with the rule of immediately lower weight.

When the content of the rule has been stored which is adapted to instruct the user to respond to his request, the final content thus stored is returned.

It is possible that the content of a rule only partially instructs the user in his search. For example, the content of a rule can relate to only a particular flight period not totally covering the period of the flight sought by the user. In this connection, once the content of the selected rule has been stored, the operations of selection of a rule are again repeated to search among the successive rules for the complement of the content necessary to the response.

So as further to illustrate the operation of the present invention, there are given hereafter two detailed examples for the search of a rule corresponding to a user request.

In a first example, 4 markets are defined as follows:
M1=Great Britain+France−Charles de Gaulle
M2=Great Britain+Bangkok+Singapore
M3=Europe
M4=Bangkok Within the scope of a rule of the type of traffic restriction, the following rules are defined:

| Criteria | Identification of the rule | Content of the rule | Weight |
|---|---|---|---|
| Pair of markets: M3 → M4<br>Flight group: BA1-10<br>Flight date: January 20 | R5 | K | 64 + 16 = 80 |
| Pair of markets: M1 → M2<br>Flight group: International<br>Flight date: 1$^{st}$ to 15 January | R4 | R, L | 64 + 16 = 80 |
| Pair of markets: M1 → M2<br>Flight group: Interior<br>Day of the week: 7 | R3 | W | 64 + 8 = 72 |
| Pair of markets: M3 → M4<br>Flight period: 16 to 19 January | R2 | L | 16 |
| Pair of markets: M1 → M2 | R1 | K | 0 |

The entered flight period is:
LONDON HEATHROW→BANGKOK–BA9–10JAN–31JAN–1234567

Two rules have the same weight (80) and the input agrees with all the criteria. The process determines which rule will be selected by selecting the most precise pair of markets:
M3 causes London Heathrow to agree with the priority of
M4 causes Bangkok to agree with the priority of 1
M1 causes London Heathrow to agree with a priority of 4
M2 causes Bangkok to agree with a priority of 5.

Because of this, the pair of markets M3-M4 has a priority of 5+1=6 and the pair of markets M1-M2 has a priority of 4+1=5.

The process will thus select the pair of markets M1-M2 (rule R4) which is the most precise pair of markets.

Rule R4 is applicable because BA9 forms a portion of the international flight group. On the other hand, as there is a flight period, rule R4 is applicable only to January 1st to 15.

The process must thus find another rule. It selects the second rule which has the same priority but of which the pair of markets is less precise (namely rule R5) which is applicable only to the 20$^{th}$ of January.

As the flight is not completely defined, the process will search the rule which has the next best weight, namely rule 3 which has a weight equal to 72. On the other hand, as one of the criteria of this rule is interior and the input is international (BA9 forms a part of the international flight group), this rule R3 does not apply.

The process then looks at rule R2 which has a weight of 16 and notes that it is applicable from January 16 to 19. Rule R1, which has no weight, is applicable from January 21 to 31.

Because of this, the rules which will be returned are:
R5 which is applicable only to January 20
R4 which is applicable from January 10 to 15
R2 which is applicable from January 16 to 19
R1 which is applicable from January 21 to 31

In a second example, the 4 markets are defined as follows:
M1=Japan+France
M2=Australia
M3=World
M4=Asia In the field of a rule of the traffic restriction type, the following rules are defined:

| Criteria | Identification of the rule | Content of the rule | Weight |
|---|---|---|---|
| Pair of markets: M3 → M4<br>Flight group: BA1-10<br>Flight period: 10 to 15 January | R1 | K | 64 + 16 = 80 |
| Pair of markets: M3 → M4<br>Flight period: 10 to 20 January | R2 | R, L | 16 |
| Pair of markets: M2 → M1<br>Flight period: 10 to 20 January | R3 | W | 16 |
| Pair of markets: M3 → M3 | R4 | L | 0 |

The entered flight period is:
MELBOURNE→TOKYO–BA1–10JAN–20JAN–1234567

The process will select Rule R1 having a weight of 80. However, as the rule has a flight period which does not cover all the input parameters, the user must search for another rule.

Two rules have a same weight of 16 and agree with all the criteria. The process will determine which rule will be selected by selecting the most precise pair of markets:
M3 agrees with Melbourne with a priority of 6
M4 agrees with Tokyo with a priority of 5
M2 agrees with Melbourne with a priority of 4
M1 agrees with Tokyo with a priority of 4.

Because of this, the pair of markets M3-M4 has a priority of 5+6=11 and the pair of markets M1-M2 has a priority of 4+4=8.

The process will thus select the pair of markets M1-M2 corresponding to rule 3 because it is the most precise pair of markets.

The flight is completely defined because all the parameters of input are covered by the criterion of the flight period.

Because of this, the rules which will be returned are:
R1 which applies to January 10 to 15
R3 which applies to January 10 to 20.

Of course, the process of the invention can comprise other fuctionalities, for example connected to the efficacy of rules previously created.

| REFERENCES | |
|---|---|
| 1. | Computer reservation system |
| 2. | Central server |
| 3. | Central database |
| 4. | Point of sale server |
| 5. | Database of points of sale |
| 6. | Graphical user interface |

The invention claimed is:
1. A method for storing and accessing data in databases of a computerized travel reservation system, comprising the steps of:
providing in the computerized travel reservation system a database system storing database data comprising data used for the sale of reservation products and including service information data applicable to flights, the database system comprising a database to store rules created for accessing the database data in the database system;
defining a list of market pairs each comprised of an origin market and a destination market, each rule comprising a criteria section comprising at least one criterion defining flights to which the rule is applicable, and each rule further comprising a content section comprising data corresponding to a type of service information data applicable to said applicable flights, the at least one criterion in each rule being a market pair, the market pair comprising:

i) an origin market defining a geographic zone of departure of a flight, and ii) a destination market defining a geographic zone of arrival of the flight, the origin market and the destination market each correspond to at least one geographic zone type selected from a set of zone types comprised of a plurality of coherently defined geographic zone types each having a geographic precision that differs from a geographic precision of others of the plurality of geographic zone types;

storing in the database system a table containing the plurality of coherently defined geographic zone types and a priority rank having a value that is associated with each individual one of the plurality of geographic zone types, the values being in a range of values from a smallest value associated with a most-precise geographic zone type to a largest value associated with a least precise geographic zone type;

receiving a request for a flight search at the computerized travel reservation system, where the request for the flight search comprises an origin market and a destination market, accessing in the database system the database to find rules with market pairs agreeing with both the origin market and the destination market received with the request for the flight search, for those rules found to have market pairs agreeing with both the origin market and the destination market, for each found rule, the computerized travel reservation system accessing the table of the geographic zone types and computing the priority value of each market pair that agrees with both the origin market and the destination market, and returning one of the stored rules based on a priority of a selected market pair as indicated by the value of the priority rank associated with the geographic zone type of the origin market and the value of the priority rank associated the geographic zone type of the destination market of the selected market pair, where returning returns, as a response to the request for the flight search that comprises at least the origin market and the destination market, the content of the rule having the market pair with a best computed priority value, the returned content comprising the data for the applicable service information for flights that correspond to at least the specified origin market and destination market.

2. The method according to claim 1, in which said stored table includes at least:

i) an airport geographic zone type with a first priority rank that is the smallest value, ii) a city geographic zone type with a second priority rank greater than the first priority rank, iii) a country geographic zone type with a third priority rank greater than the second priority rank, and iv) a geographic region geographic zone type with a fourth priority rank greater than the third priority rank.

3. The method according to claim 1, in which the geographic zone type of the origin market and the geographic zone type of the destination market, of at least some of the stored rules, are different.

4. The method according to claim 3, comprising the further step of:

calculating a priority of each market pair by assigning a first priority value to the origin market based on the priority rank associated with the geographical zone type of the origin market, ii) assigning a second priority value to the destination market based on the priority rank associated with the geographical zone type of the destination market, and iii) combining the first priority and the second priority.

5. The method according to claim 1, comprising the further step of:

calculating a priority of each market pair by i) assigning a priority value to the origin market based on the priority rank associated with each geographical zone type of the origin market, ii) assigning a second priority value to the destination market based on the priority rank associated with each geographical zone type of the destination market, and iii) combining the priority values of the origin market with the priority values of the destination market.

6. The method according to claim 1, comprising the further steps of:

defining, within the first criteria section for at least some of the rules, additional criteria used for selection of a flight; and assigning, to each of the additional criterion, a value corresponding to a weight based on a degree of importance of each additional criterion, where a total weight of each rule is a total of the weights assigned to the additional criteria.

7. The method according to claim 4, comprising the further steps of:

defining, within the first criteria section for at least some of the rules, additional criteria used for selection of a flight; and assigning, to each of the additional criterion, a value corresponding to a weight based on a degree of importance of each additional criterion, where a total weight of each rule is a total of the weights assigned to the additional criteria.

8. The method according to claim 7, comprising the further steps of where for those rules found to have market pairs agreeing with both the origin market and the destination market, and for each such rule, the computerized travel reservation system computing the priority value of each market pair by i) assigning a priority value to the origin market based on the priority rank associated with each geographical zone type of the origin market, ii) assigning a second priority value to the destination market based on the priority rank associated with each geographical zone type of the destination market, and iii) combining the priority values of the origin market with the priority values of the destination market to define the computer priority value of the market pair of the rule; and responsive to the receipt of the flight search, the computerized travel reservation system returning the content of the rule having the market pair with the lowest computed priority value.

9. The method according to claim 8, in said step of returning the content of the rule having the market pair with the lowest computed priority value, of two rules having the same lowest computed priority value, the method returns the content of the rule having the origin market with the lowest priority value.

10. The method according to claim 1, where the service information is comprised of identifiers of the loading terminals for applicable flights.

11. The method according to claim 1, where the service information is comprised of information concerning traffic restrictions for applicable flights.

12. The method according to claim 1, where the service information is comprised of rules relating to the distribution of tickets by the Internet for the applicable flights.

13. The method according to claim 1, where the service information is comprised of rules relating to meal service for the applicable flights.

14. The method according to claim 1, where the service information is comprised of information identifying types of classes of reservations recognized for the applicable flights.

15. The method according to claim 2, where the service information is comprised of identifications of the loading terminals for the applicable flights so that loading terminals are determinable, via the defined market pair, for flights between the origin market and the destination market of the defined market pair.

16. The method according to claim 1, where the service information is comprised of rules relating to meal service for the applicable flights so that meal service is determinable, via the defined market pair, for flights between the origin market and the destination market of the defined market pair.

17. The method according to claim 1, the plurality of geographic zone types comprising at least an airport geographic zone type, a city geographic zone type, a state geographic zone type, a country geographic zone type, a geographic region geographic zone type, and a world geographic zone type.

* * * * *

UNITED STATES PATENT AND TRADEMARK OFFICE
CERTIFICATE OF CORRECTION

| | |
|---|---|
| PATENT NO. | : 8,489,435 B2 |
| APPLICATION NO. | : 10/520114 |
| DATED | : July 16, 2013 |
| INVENTOR(S) | : Hugues Gabriel et al. |

Page 1 of 3

It is certified that error appears in the above-identified patent and that said Letters Patent is hereby corrected as shown below:

The title page showing the illustrative figure should be deleted to be replaced with the attached title page.

In the Drawings:

In the drawing sheets, consisting of Fig. 2, should be deleted to be replaced with the drawing sheet, consisting of Fig. 2, as shown on the attached pages.

In the Specification:

At column 2, line 11, change "define" to --defined--.

At column 7, line 44, after "only" insert --from--.

In the Claims:

At column 9, claim 1, line 45, after "associated" insert --with--.

Signed and Sealed this
Twenty-ninth Day of October, 2013

Teresa Stanek Rea
*Deputy Director of the United States Patent and Trademark Office*

(12) United States Patent
Gabriel et al.

(10) Patent No.: US 8,489,435 B2
(45) Date of Patent: Jul. 16, 2013

(54) METHOD AND DEVICE FOR STORING AND ACCESSING DATA IN A COMPUTER TRAVEL RESERVATION SYSTEM

(75) Inventors: Hugues Gabriel, Nice (FR); Vanessa Auzanne, Nice (FR); Alexandre Taillades, Nice (FR)

(73) Assignee: Amadeus S.A.S., Sophia Antipolis (FR)

( * ) Notice: Subject to any disclaimer, the term of this patent is extended or adjusted under 35 U.S.C. 154(b) by 619 days.

(21) Appl. No.: 10/520,114

(22) PCT Filed: Jun. 13, 2003

(86) PCT No.: PCT/FR03/50010
§ 371 (c)(1),
(2), (4) Date: Jan. 3, 2005

(87) PCT Pub. No.: WO2004/006147
PCT Pub. Date: Jan. 15, 2004

(65) Prior Publication Data
US 2006/0020625 A1    Jan. 26, 2006

Related U.S. Application Data

(60) Provisional application No. 60/444,673, filed on Feb. 4, 2003.

(30) Foreign Application Priority Data
Jul. 2, 2002    (FR) .................................... 02 08241

(51) Int. Cl.
*G06Q 10/00*    (2006.01)
(52) U.S. Cl.
USPC ........................................... 705/5; 705/6

(58) Field of Classification Search
USPC ........................................... 705/5, 6
See application file for complete search history.

(56) References Cited

U.S. PATENT DOCUMENTS

| | | | |
|---|---|---|---|
| 4,788,643 A * | 11/1988 | Trippe et al. | 705/6 |
| 5,021,953 A * | 6/1991 | Webber et al. | 705/6 |
| 5,948,040 A * | 9/1999 | DeLorme et al. | 705/5 |
| 6,023,679 A | 2/2000 | Acebo et al. | 705/5 |
| 6,202,065 B1 * | 3/2001 | Wills | 707/5 |
| 6,236,938 B1 | 5/2001 | Atkinson et al. | 701/214 |
| 7,194,417 B1 | 3/2007 | Jones | 705/5 |
| 7,305,356 B2 | 12/2007 | Rodon | 705/27 |
| 7,428,596 B2 | 9/2008 | Grandemange et al. | 709/238 |
| 2001/0007088 A1 * | 7/2001 | Winter et al. | 701/208 |

(Continued)

OTHER PUBLICATIONS

Article entitled "Amadaues Pro Tempo Guide", dated 2004.*

(Continued)

*Primary Examiner* — Mahesh Dwivedi
(74) *Attorney, Agent, or Firm* — Wood, Herron & Evans, LLP (57) ABSTRACT

A process for storing and accessing data in databases of a computerized travel reservation system includes, for each type of information to be stored, created rules associating a set of criteria defining the trips to which the information applies, and a content representing the value of the information to be applied, the set of criteria of a rule including a pair of markets with a market of origin that is defined by the geographical zone of departure on the trip and a destination market which is defined by the geographical zone of arrival of the trip. A database stores the defined markets and a database stores the created rules.

17 Claims, 4 Drawing Sheets

Fig. 2